Dec. 30, 1924.
T. ROBINSON
ROOFING ELEMENT
Filed Aug. 22, 1923
1,521,128
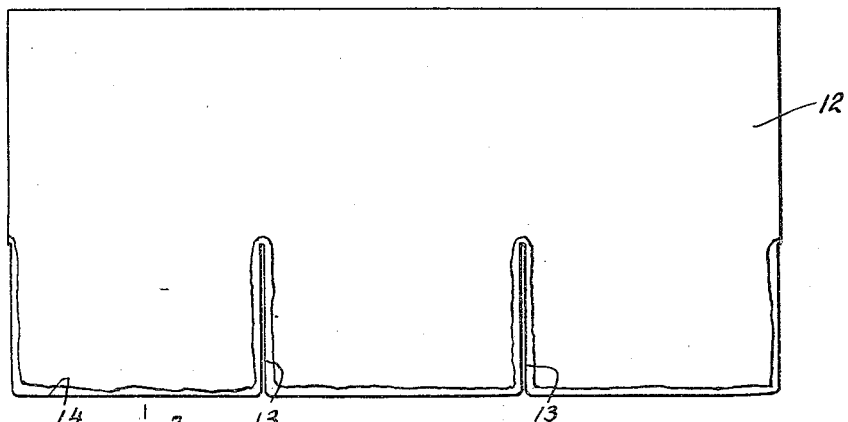

Patented Dec. 30, 1924.

1,521,128

UNITED STATES PATENT OFFICE.

THOMAS ROBINSON, OF BABYLON, NEW YORK, ASSIGNOR TO ANACONDA SALES COMPANY, A CORPORATION OF DELAWARE.

ROOFING ELEMENT.

Application filed August 22, 1923. Serial No. 658,664.

*To all whom it may concern:*

Be it known that I, THOMAS ROBINSON, a subject of the King of Great Britain, residing at Babylon, in the county of Suffolk, State of New York, have invented certain new and useful Improvements in Roofing Elements; and I do hereby declare the following to be a full, clear, and exact description of the invention, such as will enable others skilled in the art to which it appertains to make and use the same.

This invention relates to roofing elements in the form of strips, single or multiple shingles, tiles, and the like. The invention involves the provision of a novel roofing element of an improved construction which is in the general form of the so-called composition roofing elements now in wide use, but which possesses distinctive characteristics of value and importance due, primarily, to the provision of a coating of glass over the entire surface of the shingle which is exposed to the weather. The roofing element which forms the subject matter of the present application is non-hygroscopic, is unaffected by varying weather conditions, is of light weight, possesses good heat-insulating qualities, and can be sawn and nailed like wood; also the element may be manufactured and installed at a low cost.

These several objects are attained in accordance with the invention by the provision of a base formed of a plastic, heat-insulating composition, and a coating of glass applied directly to the surface of the base and adhering thereto, the glass coating or film being applied preferably by spraying the base with the glass in the molten condition.

The base employed is made of a non-metallic composition of such character as to permit the element to be molded to the desired shape and so to form a non-hygroscopic, heat-insulating, substantially rigid element which will not warp or curl. The composition I prefer to use for this purpose is one consisting of granulated cork, with or without a binder. When used without additional binding material the cork is subjected to heat and pressure under such conditions as to cause the particles to be held together by means of the binding effect of the essential oils and resins contained in the cork; or else the composition may be formed with suitable binders such as are well known and commonly used for the making of granulated cork products. The use of a cork base, through which the rate of heat transmission is slow, permits of laying the elements without additional sheathing layers and such a base does not readily deteriorate and will not warp or curl under extreme weather conditions. Other materials which are non-hygroscopic and non-warping may also be used, and it is possible to employ for this purpose wood fibre or asbestos products or other similar composition materials suitably impregnated and one form of impregnating material which is satisfactory for this purpose is one containing magnesite. The coating or film which is to be applied to the base is of glass of low melting point, and this glass may be applied in any convenient manner. Preferably the glass in the form of a rod or tube will be fed into an electric arc and the molten glass will be directed onto the surface of the element by suitable air currents. The process may be carried on in a closed chamber from which the air is continually exhausted, and these air currents will be preheated to a high temperature so as not to chill the molten glass before the deposition takes place.

The base may be of any form suitable for application to a roof. One of the convenient forms in which it will be made is that of a rectangular shingle, molded preferably with a somewhat beveled edge around that area which is to be exposed when the shingle is laid. Instead of a single shingle the base may be formed in the shape of a multiple shingle, in which the single shingles are simulated by means of cut-out portions along the edge which is to be exposed. The base may also be made in the form of Spanish tiles, English tiles, mission tiles, and the like. Such a base may either have a substantially smooth or a roughened surface but with the smooth surface it is preferable to subject it to a roughening process which will produce small irregularities so that the glass which is to be applied thereto may conform to these irregularities and thus, entering into the small depressions, form a closely adhering film which covers and protects the base. In some instances the material of which the base is made will cause its surface to have the irregularities referred to in sufficient quantity and degree so that the desired effect is produced but if the irregularities to which the glass is to adhere are not present to the desired extent then the further roughening should be employed. In roughening or specially treating the base, the object in view is to obtain a surface to which the glass may adhere with a keying action. Such a coating may be applied over the entire surface of the base, or may be limited to one surface only, or, if desired, only to that part of the base surface which is to be exposed to the weather. For reasons of economy in manufacture, however, it is preferable to form the elements with one entire surface covered with the glass.

In the accompanying drawings there are illustrated various embodiments of the invention, showing roofing elements of different shapes and forms. In these drawings, Fig. 1 is a plan view of a multiple shingle unit, Fig. 2 is an end view of the same, Fig. 3 is a section on the line 3—3 of Fig. 1, showing a coating applied to both surfaces of the element, Fig. 4 is a view similar to Fig. 3, showing only the upper surface coated, Fig. 5 is a plan view of a single shingle element, Figs. 6 and 7 are cross-sectional views on the line 6—6 of Fig. 5, Fig. 6 showing a complete coating of the base, and Fig. 7 showing a coating over one surface only, Figs. 8 and 9 are end and top views, respectively, of a Spanish tile made in accordance with my invention, Fig. 10 is an end view of a mission tile, and, Fig. 11 is an enlarged sectional view of a portion of the coated element.

In these drawings the base is made of various materials above referred to, and is non-metallic, non-hygroscopic, and heat-insulating. Such a base composition may be molded into any form and the glass coating thereafter applied thereto. In Fig. 1 the base 12 is of a size suitable for making so-called multiple shingle units, and at that edge which is to be exposed when the elements are laid in overlapping courses the base is provided with cut-outs 13 by which the appearance of single shingles is simulated.

As is indicated in Fig. 2, in forming the base the edge 14 is preferably beveled off as shown at 15, this beveling occurring not only along the lower edge, but extending along either side of the cut-outs. The purpose of such treatment is to provide the base with an exposed edge which is somewhat irregular so as to give it the appearance, when in use, of slate roofing. Also when the coating is applied it easily covers the edge portions down to the extreme margin of the base, and therefore, protects all portions of the weather surface thereof.

In Fig. 3 the base is shown as provided with a coating 16, which extends throughout the surface of the base, covering both faces and the beveled and squared edge portions.

Fig. 4 shows an element in which the coating has been applied only over the upper surface of the base and to the beveled edge portions. The element illustrated in Fig. 4 is most easily made and such a coating is satisfactory for general purposes.

In Fig. 5 there is shown a single shingle element, the exposed edge 17, of which has been given the irregular bevel previously referred to. Such an element is provided with cut-out portions along either edge as at 18, so that two adjacent elements may be laid with their rear edges 19 in contact, the cut-out portions 18 serving to produce the desired spacing effect.

The coating to be applied to such an element is illustrated in Figs. 6 and 7, in the first of which the coating is shown applied over the entire surface of the element, while in Fig. 7 the coating is applied only to the upper or exposed surface.

Figs. 8, 9 and 10 illustrate Spanish and mission tiles which are roofing forms in use at the present time. The protective coating may be applied throughout the entire surface of such elements, or may be applied simply to that surface thereof which is to be exposed when the elements are laid. These tiles are made of the base composition previously referred to, and the coating is applied in the usual way.

In Fig. 11 there is shown, in somewhat exaggerated form, a cross-sectional view of the base and coating, and it will be noted that the base has certain irregularities or undulations which naturally occur during its formation or which are produced intentionally by the roughening process previously mentioned. Although the base is, to outward appearances, quite smooth, actually it has many ridges and depressions and when the coating 20 is applied to the base this layer or film will conform to these irregularities and serve to provide a means by which the film is caused to adhere to the base.

In applying the coating to the base one satisfactory method is by means of the electric arc. The base made of the desired materials and given the required form is introduced into a closed chamber which is continually exhausted by an air pump. In this chamber are located electrodes, between which an arc is struck, and the glass, either in the form of a rod or tube, is introduced into the arc and rendered molten. The rod or tube will be gradually and continuously fed into the arc so that the application of the glass is uniform. This molten glass so produced is then directed by preheated air currents over the surface of the base and upon coming in contact therewith cools at once, although the base and the arc are maintained in sufficient proximity so that the glass does not have an opportunity to crystallize prior to its adherence to the base.

The glass to be used in this connection is of a low melting point and while I have designated such material generally by the term "glass", it will be understood that this designation is intended to include other eutectic substances of a character similar to glass, such as various so-called enamels, and the like. The glass applied may also be colored, in which event the elements will also have a colored appearance. The film of glass is ordinarily quite thin, although a film of any desired thickness may be used and may be applied either in one application or in a succession of steps.

The physical properties of the base are such that nails may be easily driven through it, and since the thin film of glass is more or less resiliently supported by the base throughout its entire surface, the driving of nails through the glass and the base will not cause a shattering of the glass, but simply a puncture. Also the base is of sufficient rigidity so that the complete element may be handled without danger of cracking the glass, this danger being further eliminated by the complete support which is given the film by the base. In cutting the elements the film will be scratched by a file or glass cutter, and the base may then be cut or sawn as may be desired.

By the employment of the materials above generally referred to in the construction of the roofing element, the product which results has many distinct advantages. The glass coating does not corrode and readily withstands varying weather conditions. Also the elements, when applied, give the roof a distinctive and attractive appearance, and the use of glass produces a self-cleaning roof to which dirt does not readily adhere. By using colored glass it is possible to provide roofing elements which harmonize with the rest of the building on which the roof is laid. As the glass is a comparatively slow conductor of heat, this combination of a composite base with a glass film thereover permits of constructing the roof without the use of underlying layers of sheathing material. This is particularly true when the base used is a cork composition. A roofing element constructed in the manner above described, therefore, will withstand severe weather conditions and extreme changes in temperature, inasmuch as the glass will not expand sufficiently to cause it to separate from the base, and an element formed of the protective base will not warp. Furthermore, the glass film provides a fire-resisting roofing and the combination is a good heat-insulator. The elements are light and comparatively inexpensive to manufacture, and a roof may be made of them without the necessity of closing the joints by means of soldering or special cementing operations. The glass layer applied in the manner previously described may be given a smooth finish, or may be allowed to remain in the form which results from the deposition. In the latter instance the glass will have a somewhat roughened appearance, which results in giving the element a texture and this produces a finish which is highly desirable, and, in many cases, preferable to the smooth and shiny glass surface.

I claim:

1. A roofing element comprising a non-hygroscopic, heat-resistant, non-warping base of a plastic material, and a coating of glass applied to the surface thereof and forming a continuous layer.

2. A roofing element comprising a non-hygroscopic, heat-resistant, and substantially rigid base of plastic material having small irregularities over substantially its entire surface and a thin glass coating applied to the base to form a continuous layer and conforming to the irregularities of the surface.

3. A roofing element comprising a non-hygroscopic, heat-resistant and substantially rigid base formed of a moldable composition containing a granular substance, the base having small irregularities over substantially its entire surface and a thin film of glass applied to the base and conforming to the irregularities thereof.

4. A roofing element comprising a substantially rigid base formed of granulated cork, and a coating of glass applied to the surface thereof to form a continuous layer.

5. A roofing element comprising a base formed of granulated cork united into a substantially rigid mass by the simultaneous action of heat and pressure, and a coating of glass applied to the surface thereof to form a continuous layer.

6. A roofing element comprising a base composed of granulated cork subjected to the action of heat and pressure to form a substantially rigid mass, this base having surface irregularities over substantially its entire surface, and a film of glass applied to the base and conforming to the irregularities thereof.

7. A roofing element comprising a substantially rigid base composed primarily of cork, and a thin film of glass applied to the surface of the base.

In testimony whereof I affix my signature.

THOMAS ROBINSON.